(12) United States Patent
Grau

(10) Patent No.: US 6,892,705 B2
(45) Date of Patent: May 17, 2005

(54) METHOD FOR OPERATING AN INTERNAL COMBUSTION ENGINE

(75) Inventor: Kai-Uwe Grau, Neuenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/381,134

(22) PCT Filed: Sep. 6, 2001

(86) PCT No.: PCT/DE01/03414
§ 371 (c)(1),
(2), (4) Date: Mar. 24, 2003

(87) PCT Pub. No.: WO02/25089
PCT Pub. Date: Mar. 28, 2002

(65) Prior Publication Data
US 2004/0011333 A1 Jan. 22, 2004

(30) Foreign Application Priority Data
Sep. 22, 2000 (DE) .......................................... 100 47 001

(51) Int. Cl.⁷ .............................................. F02D 41/38
(52) U.S. Cl. ....................... 123/464; 123/456; 123/458; 123/480; 701/103; 701/105
(58) Field of Search .............................. 123/464, 456, 123/458, 478, 480; 701/103, 105

(56) References Cited

U.S. PATENT DOCUMENTS

| 4,633,837 | A | | 1/1987 | Babitzka et al. ............ 123/478 |
| 5,711,275 | A | | 1/1998 | Arai et al. .................... 123/458 |
| 5,908,022 | A | | 6/1999 | Aoki et al. .................. 123/569 |
| 6,109,244 | A | * | 8/2000 | Yamamoto et al. ......... 123/478 |
| 6,223,731 | B1 | * | 5/2001 | Yoshiume et al. .......... 123/497 |
| 6,378,501 | B1 | * | 4/2002 | Hisato et al. ............... 123/458 |

FOREIGN PATENT DOCUMENTS

| DE | 195 47 644 | 6/1997 |
| EP | 0 777 042 | 6/1997 |
| EP | 0 886 058 | 12/1998 |
| GB | 2 290 112 | 12/1995 |

* cited by examiner

Primary Examiner—Weilun Lo
(74) Attorney, Agent, or Firm—Walter Ottesen

(57) ABSTRACT

The invention relates to a method for operating an internal combustion engine (1) especially of a motor vehicle, wherein fuel, which is to be injected into a combustion chamber (4) or into an intake manifold (7) of the engine (1), is present in a pressure store (13) at a variable injection pressure (p). The injection pressure (p) in the pressure store (13) is adjusted in dependence upon the temperature (T) of the engine (1) in order to obtain an optimal operation of the engine (1) with respect to the lowest possible consumption of fuel and a lowest possible exhaust-gas emission in specific operating states of the engine (1), for example, after a cold start or during a warm-up phase. Preferably, the injection pressure (p) is increased at a temperature (T) of the engine (1) below the operating temperature thereof. In addition, the injection time point can be adjusted to later time points at low temperatures (T) of the engine (1).

11 Claims, 2 Drawing Sheets

METHOD FOR OPERATING AN INTERNAL COMBUSTION ENGINE

FIELD OF THE INVENTION

This application is a U.S. national stage of PCT/DE 01/03414 filed Sep. 6, 2001 which designates the United States.

The present invention relates to a method for operating an internal combustion engine, especially of a motor vehicle. Fuel is present in a pressure store which is to be injected into a combustion chamber or into an intake manifold of the internal combustion engine. The fuel is in the pressure store at a variable injection pressure.

The invention furthermore relates to an internal combustion engine having a pressure store, at least one combustion chamber and at least one intake manifold. Fuel is at a variable injection pressure in the pressure store. The fuel can be injected from the pressure store into the intake manifold or directly into the combustion chamber. Furthermore, the invention relates to a control apparatus for such an internal combustion engine.

The present invention furthermore relates to a storage element for a control apparatus of an internal combustion engine, especially of a motor vehicle, on which a computer program is stored which can be run on a computer apparatus, especially on a microprocessor. The storage element is configured especially as a read-only-memory, a random-access-memory or as a flash memory. Finally, the invention also relates to a computer program.

BACKGROUND OF THE INVENTION

From the state of the art, it is known to input the injection pressure in the pressure store via a characteristic field for direct-injecting internal combustion engines. The characteristic field is, however, independent of the operating temperature of the engine. Furthermore, the characteristic field is not adapted to specific operating states of the engine, for example, after a cold start or during a warm-running phase.

It is known from DE 195 47 644 A1 to compute a corrective factor for directly injecting internal combustion engines to increase the metering accuracy of the fuel mass to be injected into the combustion chamber. The fuel mass, which is to be injected, is charged with this corrective factor. The corrective factor considers the temperature dependency of the density of the fuel. The corrective factor has no effect on the injection pressure present in the pressure store.

SUMMARY OF THE INVENTION

The task of the present invention is based on adapting an injection pressure, which is present in a pressure store, to specific operating states of the internal combustion engine in order to make possible an optimal operation of the engine in these operating states with respect to fuel consumption, exhaust-gas emission and smooth running.

To solve this problem, the invention suggests, proceeding from the method for operating an internal combustion engine of the kind mentioned initially herein, that the injection pressure in the pressure store is adjusted in dependence upon the temperature of the engine.

According to the invention, the injection pressure is therefore increased or decreased in dependence upon the temperature of the engine. The temperature of the engine is, for a large part, dependent upon the operating state of the engine. Accordingly, the temperature lies considerably below the ideal operating temperature after a cold start or during a warm-running phase. The ideal operating temperature is reached during a longer-running operation of the engine.

In special operating states of the engine, an optimized operation thereof is made possible with respect to fuel consumption, exhaust-gas emission and smooth running by a temperature-dependent adjustment of the injection pressure present in the pressure store.

According to an advantageous further embodiment of the present invention, it is suggested that the injection time point be adjusted in dependence upon the temperature of the engine in addition to the temperature-dependent adjustment of the injection pressure.

According to a preferred embodiment of the present invention, it is suggested that the injection pressure is increased for a temperature of the engine below the operating temperature thereof. The increase of the injection pressure after a cold start or during a warm-up phase leads to a significantly reduced emission of hydrocarbons (HC) in these operating states. Furthermore, the increased injection pressure leads to greater demands on a pump arrangement which brings the fuel in the pressure store to the injection pressure. In this way, the load also increases which is applied to the engine and this leads overall to a more rapid warming of an exhaust-gas catalytic converter. The catalytic converter thereby reaches its operating temperature within a shorter time which is necessary for an optimal conversion of the exhaust gases.

Advantageously, the injection time point is adjusted to later time points for a temperature of the engine below the operating temperature thereof. With this measure, the increase of the injection pressure at temperatures of the engine lying below the operating temperature can be supported.

According to another advantageous embodiment of the present invention, it is suggested that the temperature of the engine is determined based on the temperature of the cooling water or based on the temperature of a cylinder head of the engine.

According to a further preferred embodiment of the present invention, it is suggested that a corrective factor is determined which is dependent upon the temperature of the engine. With this corrective factor, an injection desired value is charged which is not dependent upon temperature. The injection pressure, which is present in the pressure store, is then controlled by a control apparatus of the engine to the corrected injection pressure desired value.

Of special significance is the realization of the method of the invention in the form of a storage element which is provided for a control apparatus of an internal combustion engine, especially of a motor vehicle. A computer program is stored on the storage element and this computer program can be run on a computing apparatus, especially on a microprocessor, and is suitable for carrying out the method of the invention. In this case, the invention is therefore realized by a computer program stored on the storage element so that this storage element, which is provided with the computer program, defines the invention in the same manner as the method for whose execution the computer program is suitable. As a storage medium, especially an electric storage medium can be applied, for example, a read-only-memory, a random-access-memory or a flash memory.

The invention also relates to a computer program which is suitable for carrying out the method of the invention when it is executed on a computing apparatus, especially on a microprocessor. It is especially preferred when the computer program is stored on a storage element, especially on a flash memory.

As a further solution of the task of the present invention, it is suggested, proceeding from the internal combustion engine of the type mentioned initially herein, that the injection pressure in the pressure store is adjustable in dependence upon the temperature of the engine.

The internal combustion engine can be equipped with an intake manifold injection. According to a preferred embodiment of the present invention, it is, however, suggested that the engine have at least one injection valve for directly injecting the fuel into the combustion chamber of the engine. This fuel is present in the pressure store. The internal combustion engine is therefore preferably configured as a direct-injection gasoline engine or diesel engine.

It is especially conceivable that the pressure store is configured as a high-pressure store, for example, as a pressure rail of a common-rail fuel metering system.

Finally, as a further solution of the task of the present invention and starting from a control apparatus for an internal combustion engine of the type mentioned initially herein, it is suggested that the control apparatus adjust the injection pressure in the pressure store in dependence upon the temperature of the internal combustion engine.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
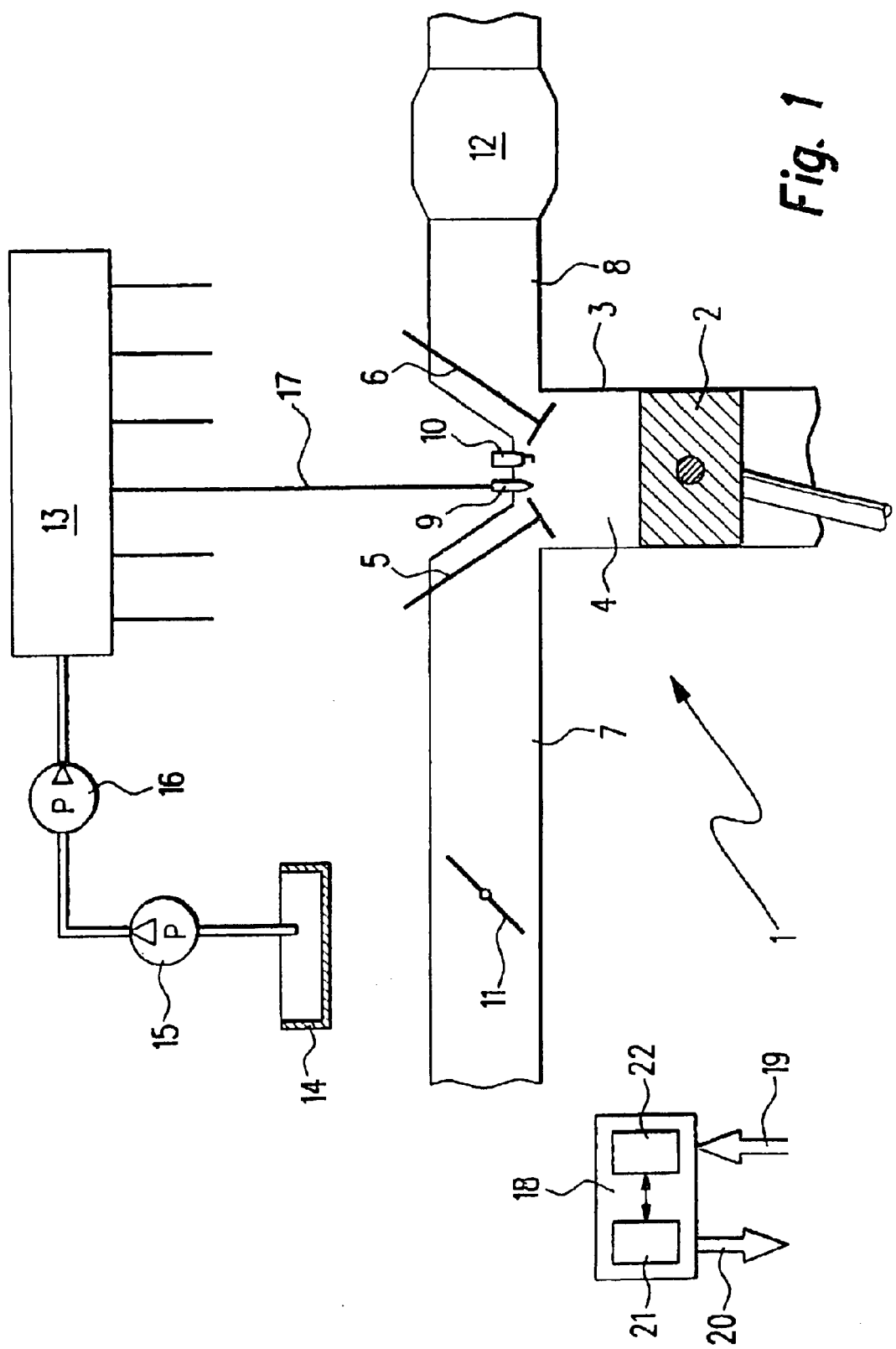
FIG. 1 shows a schematic block diagram of an internal combustion engine of the invention in accordance with a preferred embodiment; and, FIG. 2 shows a sequence diagram of a method of the invention in accordance with a preferred embodiment.

In FIG. 1, an internal combustion engine of the invention is designated in its entirety with reference numeral 1. The engine 1 includes a piston 2 which is movable back and forth in a cylinder 3. The cylinder 3 is provided with a combustion chamber 4 which, inter alia, is delimited by the piston 2, an inlet valve 5 and an outlet valve 6. An intake manifold 7 is coupled to the inlet valve 5 and an exhaust-gas pipe 8 is coupled to the outlet valve 6.

An injection valve 9 and a spark plug 10 project into the combustion chamber in the region of the inlet valve 5 and of the outlet valve 6. Fuel can be injected into the combustion chamber via the injection valve 9. The fuel in the combustion chamber 4 can be ignited by the spark plug 10. The illustrated engine 1 is therefore a gasoline-direct injecting internal combustion engine. However, the invention can easily be realized also with diesel engines.

A rotatable throttle flap 11 is accommodated in the intake manifold 7 via which air can be supplied to the intake manifold 7. The mass of the supplied air is dependent upon the angular position of the throttle flap 11. A catalytic converter 12 is accommodated in the exhaust-gas pipe 8 and this catalytic converter functions to clean exhaust gases arising because of the combustion of the fuel.

A back and forth motion is imparted to the piston 2 by the combustion of the fuel in the combustion chamber 4. This back and forth movement is transmitted to a crankshaft (not shown) and applies a torque to the crankshaft.

The fuel, which is injected into the combustion chamber 4 via the injection valve 9, reaches the injection valve 9 from the high-pressure store 13 via a fuel line 17. In addition to the cylinder 3 shown in FIG. 1, the engine 1 includes five additional cylinders to which fuel is likewise supplied from the high-pressure store 13. These additional cylinders are, however, not shown. The high-pressure store 13 is configured as a storage rail of a common-rail fuel metering system. The fuel is present at a variable injection pressure in the pressure store 13. Fuel is pumped from a fuel tank 14 by means of a presupply pump 15 to a high-pressure pump 16 which pumps the fuel further into the pressure store 13. The injection pressure, which is present in the pressure store 13, can be adjusted by a suitable drive of the high-pressure pump 16 or by pressure control valves (not shown) arranged in the pressure store 13.

Input signals 19 are applied to a control apparatus 18 of the internal combustion engine 1. These input signals 19 define operating variables of the engine 1 measured by means of sensors. For example, the control apparatus 18 is connected to an air-mass sensor, a lambda sensor, an rpm sensor, an engine temperature sensor and the like. The control apparatus 18 generates output signals 20 with which the performance of the engine 1 can be influenced via actuators. For example, the control apparatus 18 is connected to the injection valve 9, the spark plug 10, the throttle flap 11 and the high-pressure pump 16 and the like and generates the drive signals required for controlling the same.

The control apparatus 18 is, inter alia, provided for controlling (open loop and/or closed loop) the operating variables of the engine 1. For example, the fuel mass, which is injected by the injection valve 9 into the combustion chamber 4, is controlled (open loop and/or closed loop) by the control apparatus 18 especially with respect to a reduced fuel consumption and/or a low toxic-substance emission. For this purpose, the control apparatus 18 is provided with a microprocessor 21 on which a computer program can run which is suitable for carrying out the above-mentioned control (open loop and/or closed loop). The computer program is stored in a storage element 22. The storage element 22 is, for example, configured as an electrical storage medium, especially as a flash memory.

The internal combustion engine 1 can be operated in a plurality of operating modes. Accordingly, it is possible to operate the engine 1 in: a homogeneous operation, a stratified operation, a homogeneous lean operation, an operation for heating the catalytic converter, an operation for the desulphurization of the catalytic converter or an operation for nitrogen-oxide regeneration of the catalytic converter.

The control apparatus 18 controls (open loop and/or closed loop) also the injection pressure present in the pressure store 13. For this purpose, a further computer program is stored on the storage element 22 which is suitable for running on the microprocessor 21 and for carrying out the method of the invention.

Figure 2:
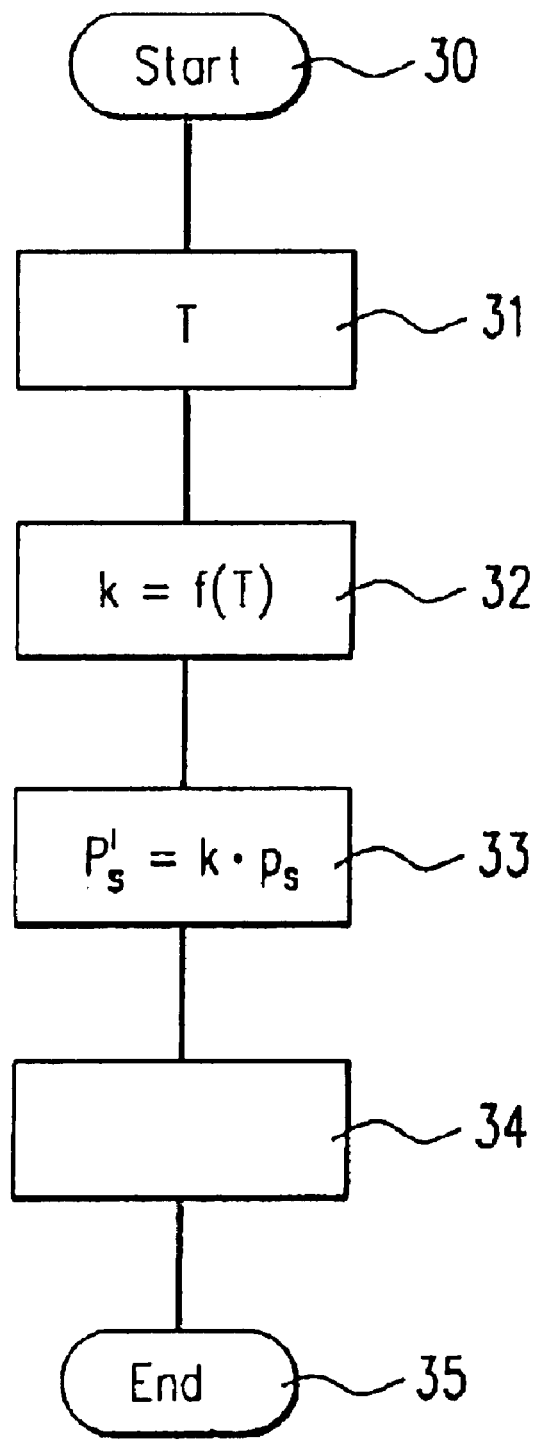

In FIG. 2, a sequence diagram of the method of the invention is shown. The method starts in a function block 30. In a function block 31, the temperature of the engine 1 is determined, for example, based on the temperature T' of the cooling water or on the temperature T' of the cylinder head.

Then, a corrective factor k is determined in a function block 32 which is dependent upon the temperature T of the engine 1. In function block 33, a corrected injection desired pressure $p\_s$ is then determined from the product of the temperature-dependent corrective factor k and an injection pressure desired value $p\_s$ which is not dependent upon temperature. This corrected injection pressure desired value p_s is supplied to a control (open loop or closed loop) of the injection pressure (function block 34) present in the pressure store 13. The injection pressure, which is present in the pressure store 13, is therefore controlled (open loop and/or closed loop) to the corrected injection pressure desired value p_s. The method of the invention is ended in a function block 35.

With the method of the invention, the injection pressure, which is present in the pressure store 13, can be increased or decreased in dependence upon the temperature T of the engine 1. The injection pressure is increased in specific operating states of the engine 1, for example, after a cold start or during a warm-up phase. In addition, the injection can be shifted to late time points. In this way, an especially low hydrocarbon (HC) emission results in the exhaust gas during these operating states.

In order to achieve the increased injection pressure in the pressure store 13, the load applied to the high-pressure pump 16 and therefore also the load on the engine 1 is increased which leads to a more rapid warming of the catalytic converter 12. The catalytic converter 12 reaches its operating temperature thereby significantly more rapidly after a cold start or during a warm-up phase. This operating temperature is required for an effective exhaust-gas conversion.

What is claimed is:

1. A method of operating an internal combustion engine including an internal combustion engine of a motor vehicle, wherein fuel, which is to be injected into a combustion chamber or into an intake manifold of the engine, is present in a pressure store at a variable injection pressure (p), the method comprising the steps of:

adjusting the injection pressure (p) in the pressure store in dependence upon the temperature (T) of the engine;

adjusting the injection time point in dependence upon the temperature (T) of the engine; and, for a temperature (T) of the engine below the operating temperature thereof, adjusting the injection time point to later time points.

2. The method of claim 1, comprising the further step of increasing the injection pressure (p) for a temperature (T) of the engine below the operating temperature thereof.

3. The method of claim 1, comprising the further step of determining the temperature (T) of the engine based on the temperature (T') of the cooling water or based on the temperature (T') of a cylinder head of the engine.

4. The method of claim 1, wherein: a corrective factor (k) is determined with which an injection pressure desired value (p-s) is charged; and, the corrective factor (k) is dependent upon the temperature (T) of the engine and the injection pressure desired value (p-s) is not dependent upon temperature.

5. A storage element including a read-only-memory, random-access-memory or flash memory, for a control apparatus of an internal combustion engine, including a control apparatus of a motor vehicle, the storage element comprising a computer program stored thereon, which can be run on a computer apparatus, including a microprocessor and said computer program being suitable for carrying out a method of operating an internal combustion engine of a motor vehicle, wherein fuel, which is to be injected into a combustion chamber or into an intake manifold of the engine, is present in a pressure store at a variable injection pressure (p), the method including the steps of:

adjusting the injection pressure (p) in the pressure store in dependence upon the temperature (T) of the engine;

adjusting the injection time point in dependence upon the temperature (T) of the engine; and, for a temperature (T) of the engine below the operating temperature thereof, adjusting the injection time point to later time points.

6. A computer readable medium comprising a computer program being suitable for carrying out the method of operating an internal combustion engine including an internal combustion engine of a motor vehicle when the computer program is run on a computer apparatus including a microprocessor, the method including the steps of:

adjusting the injection pressure (p) in the pressure store in dependence upon the temperature (T) of the engine;

adjusting the injection time point in dependence upon the temperature (T) of the engine; and, for a temperature (T) of the engine below the operating temperature thereof, adjusting the injection time point to later time points.

7. The computer readable medium of claim 6, wherein the computer readable medium is a storage element including a flash memory.

8. An internal combustion engine comprising:

a pressure store holding fuel at a variable injection pressure (p);

at least one combustion chamber and at least an intake manifold;

means for injecting the fuel from the pressure store into the intake manifold or directly into the combustion chamber;

means for adjusting the injection pressure (p) in the pressure store in dependence upon the temperature (T) of the engine;

means for adjusting the injection time point in dependence upon the temperature (T) of the engine; and, said means for adjusting the injection time point being adapted to adjust the injection time point to later time points for a temperature (T) of the engine below the operating temperature thereof.

9. The internal combustion engine of claim 8, the engine further comprising at least one injection valve for the direct injection of the fuel into the combustion chamber of the engine.

10. The internal combustion engine of claim 9, wherein said pressure store is configured as a storage rail of a common-rail fuel metering system.

11. A control apparatus for an internal combustion engine having a pressure store, at least one combustion chamber and at least an intake manifold, and wherein fuel is present at a variable injection pressure (p) in the pressure store and can be injected from the pressure store directly into the combustion chamber or into the intake manifold, the control apparatus comprising:

means for adjusting the injection pressure (p) in the pressure store in dependence upon the temperature (T) of the engine;

means for adjusting the injection time point in dependence upon the temperature (T) of the engine; and, said means for adjusting the injection time point being adapted to adjust the injection time point to later time points for a temperature (T) of the engine below the operating temperature thereof.

* * * * *